(12) United States Patent
Bale

(10) Patent No.: US 6,406,052 B1
(45) Date of Patent: Jun. 18, 2002

(54) SECURE TRAILER HITCHING POST

(76) Inventor: Bruce H. Bale, 2285 City View St., Eugene, OR (US) 97405

( * ) Notice: Subject to any disclaimer, the term of this patent is extended or adjusted under 35 U.S.C. 154(b) by 0 days.

(21) Appl. No.: 09/802,303

(22) Filed: Mar. 7, 2001

Related U.S. Application Data
(60) Provisional application No. 60/188,466, filed on Mar. 10, 2000.

(51) Int. Cl.$^7$ ................................................. B60D 1/06
(52) U.S. Cl. ..................................................... 280/507
(58) Field of Search ........................... 280/504, 511, 280/512, 513, 507; 70/58

(56) References Cited

U.S. PATENT DOCUMENTS

| | | | |
|---|---|---|---|
| 3,857,575 A | | 12/1974 | Lee |
| 4,032,171 A | | 6/1977 | Allen et al. |
| 4,141,569 A | * | 2/1979 | Dilk .......................... 280/507 |
| 4,373,303 A | * | 2/1983 | Stratichuk ..................... 52/165 |
| 4,459,832 A | * | 7/1984 | Avrea et al. ................. 280/507 |
| 4,538,827 A | | 9/1985 | Plifka |
| 4,577,884 A | | 3/1986 | Harris |
| 4,756,172 A | | 7/1988 | Weaver |
| 4,774,823 A | | 10/1988 | Callison |
| 4,836,570 A | | 6/1989 | Lopez et al. |
| 5,087,064 A | | 2/1992 | Guhlin |
| 5,094,423 A | | 3/1992 | Almquist et al. |
| 5,195,339 A | | 3/1993 | Nee et al. |
| 5,351,511 A | | 10/1994 | Bernier |
| 5,584,495 A | | 12/1996 | Mason |
| 5,700,024 A | | 12/1997 | Upchurch |
| 5,775,139 A | | 7/1998 | Sellers |
| 5,873,271 A | * | 2/1999 | Smith .......................... 280/507 |
| 6,070,441 A | * | 6/2000 | Bernstrom ................... 280/507 |

FOREIGN PATENT DOCUMENTS

| | | | | |
|---|---|---|---|---|
| GB | | 2126549 A | * 3/1984 | ........... B60R/25/00 |

* cited by examiner

Primary Examiner—Kevin Hurley
(74) Attorney, Agent, or Firm—David S. Alavi

(57) ABSTRACT

A secure trailer hitching post comprises: a) a body having an open top and a front opening and being adapted to be secured to a surrounding structure; b) a hitch ball assembly comprising a hitch ball plate positioned within and secured to the body and dividing the interior thereof into upper and lower portions, and a hitch ball; and c) a retainer assembly comprising a flat retainer plate and an apertured vertically depending tab received within a slot in the lower portion of the interior of the body. A sliding retaining shaft is positioned within apertures in the front of the body and the front of the slot, so that the retaining shaft may slide inward into the slot and through an aperture of the tab of the retainer assembly, thereby securing the tab within the slot and thereby securing the retainer assembly to the body. A coupler of a trailer is placed on the hitch ball and the retainer assembly placed within the top of the body with the tab received within the slot. The retaining shaft slides into the slot and through an aperture of the tab, and a locking mechanism engaged to prevent the retaining shaft from sliding out of the aperture, thereby securing the coupler of the trailer to the trailer hitching post and preventing unauthorized removal therefrom. The body may further comprise a horizontal channel bracket for receiving the lower edge of a garage door when the hitching post is placed on the ground and the garage door is closed.

14 Claims, 5 Drawing Sheets

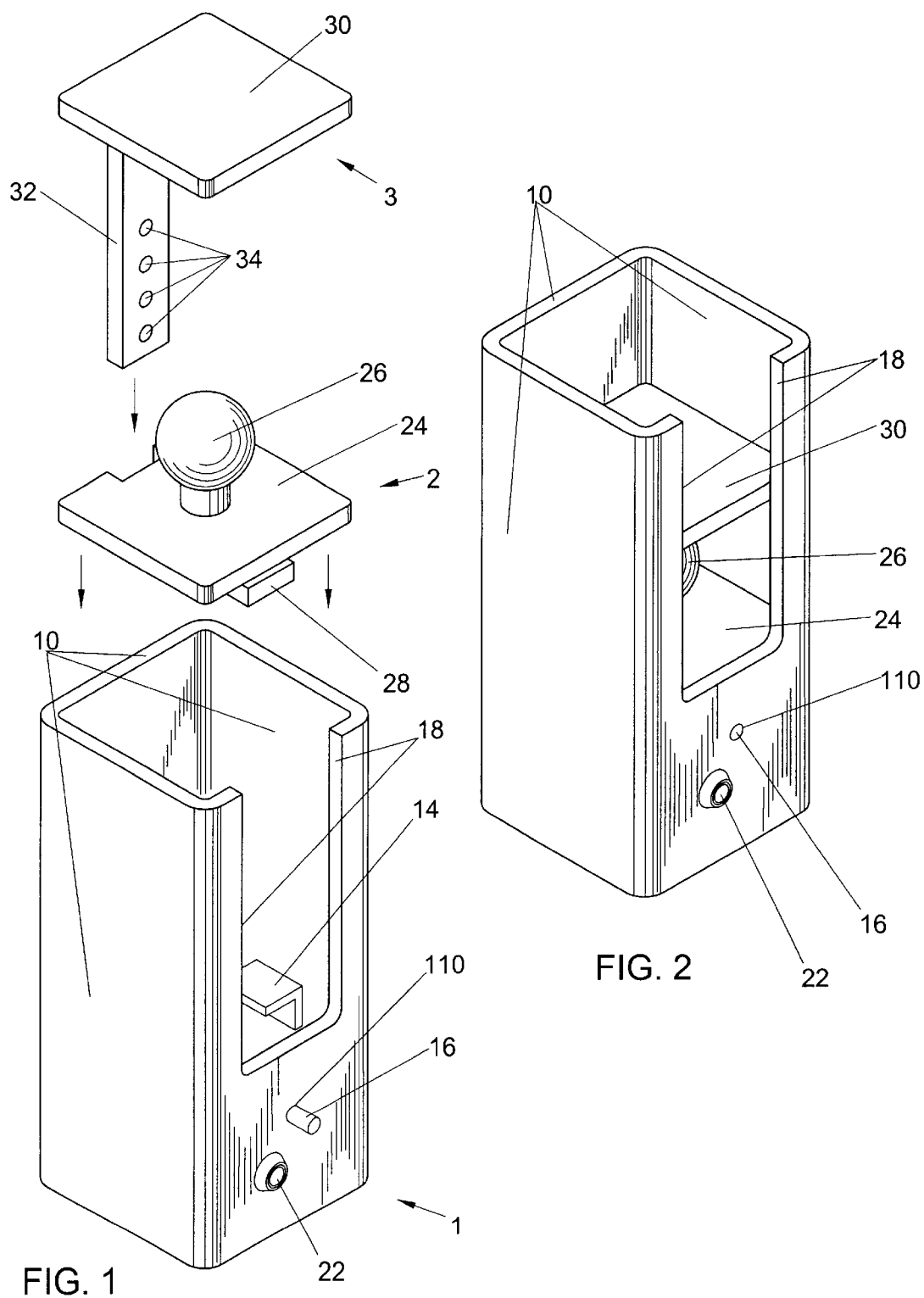

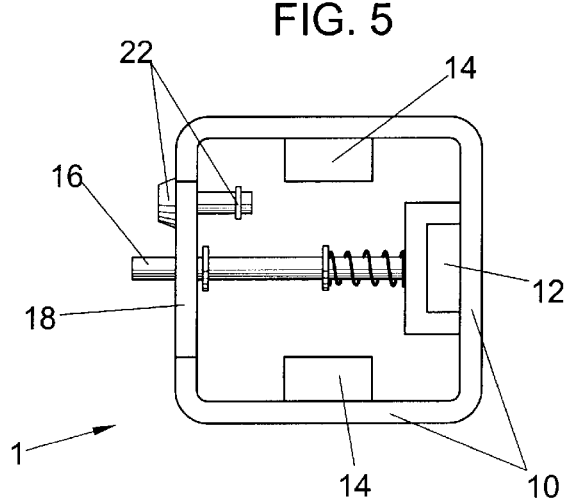
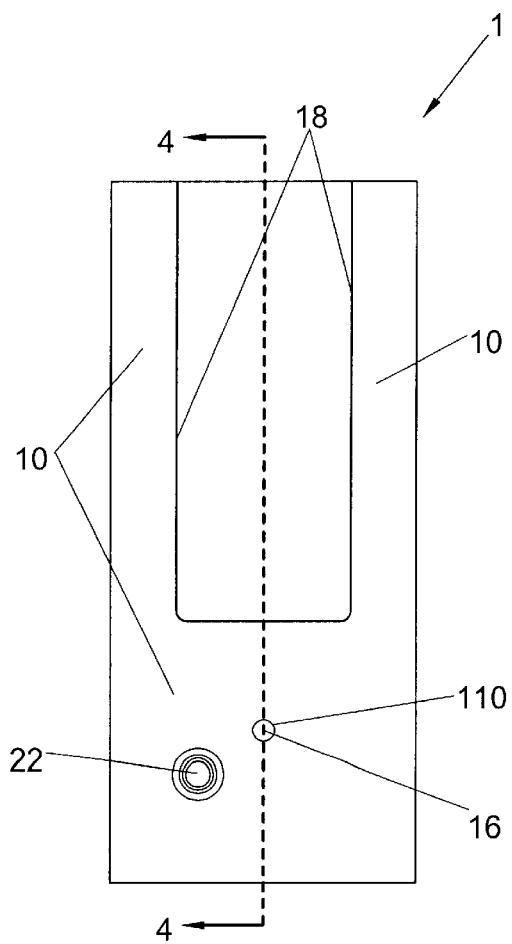
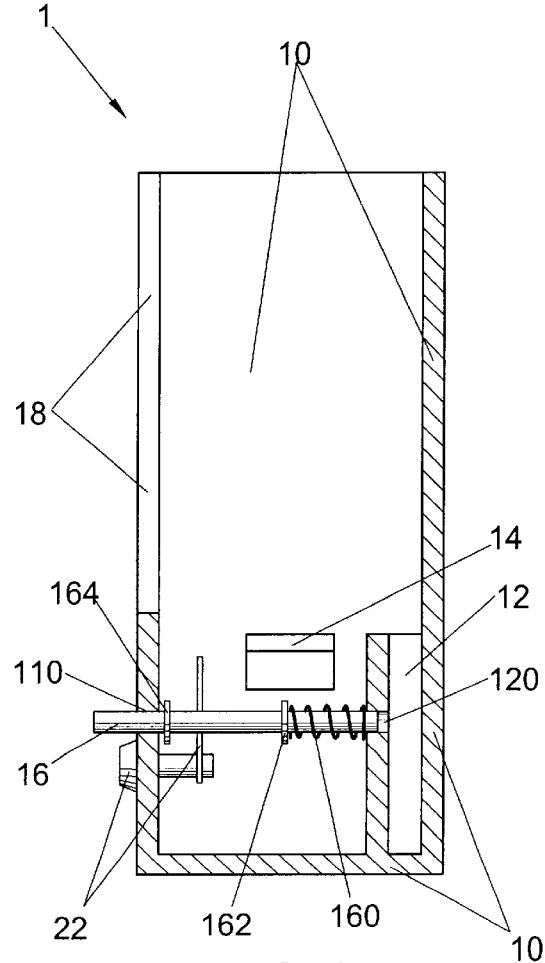
FIG. 5
FIG. 3
FIG. 4

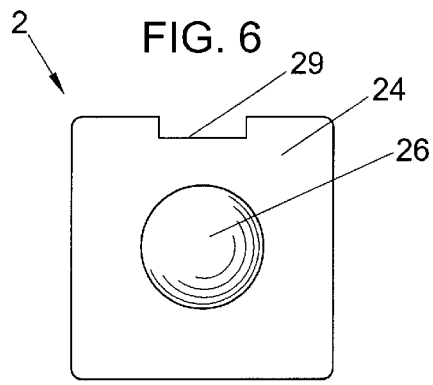
FIG. 6
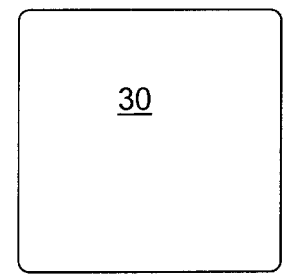
FIG. 9
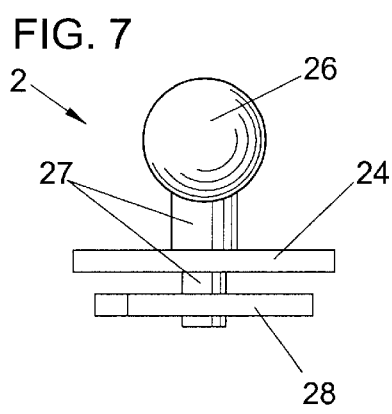
FIG. 7
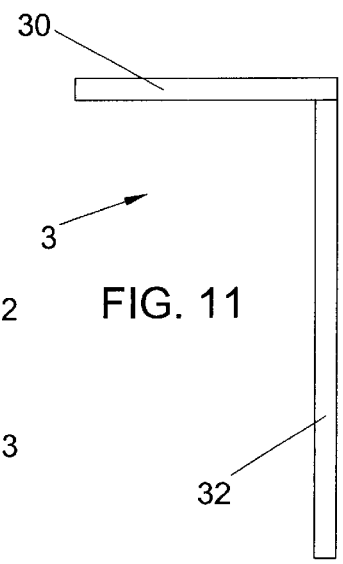
FIG. 10
FIG. 11
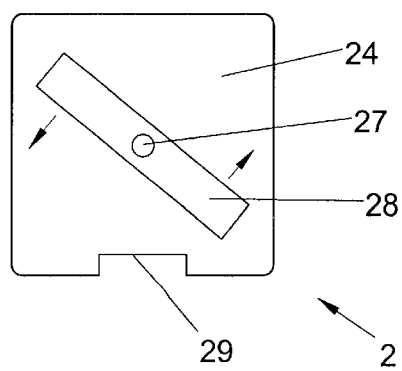
FIG. 8
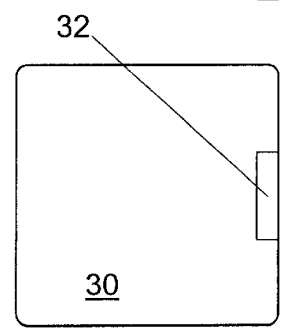
FIG. 12

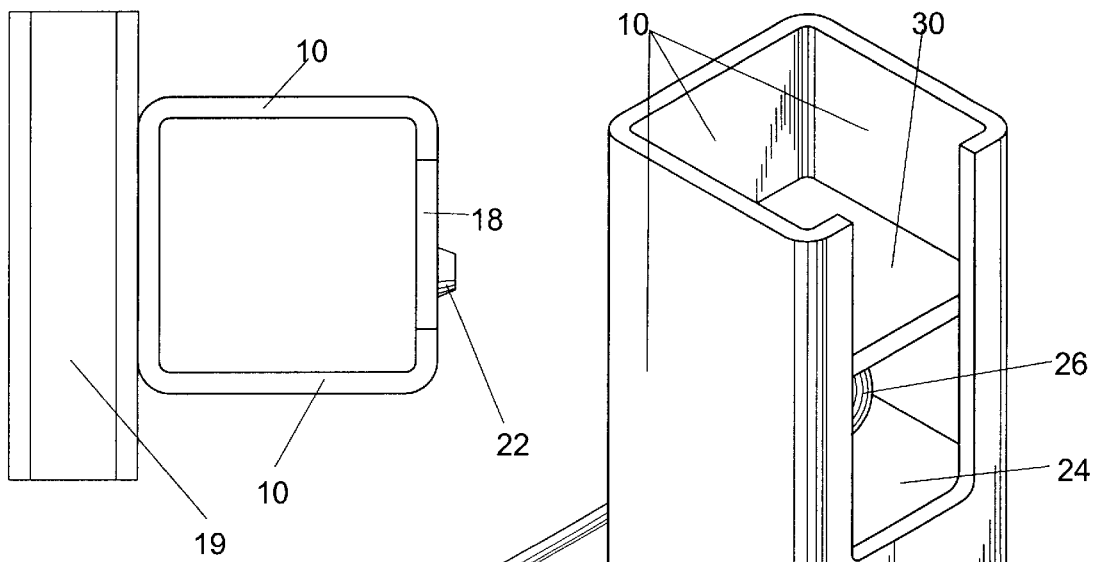
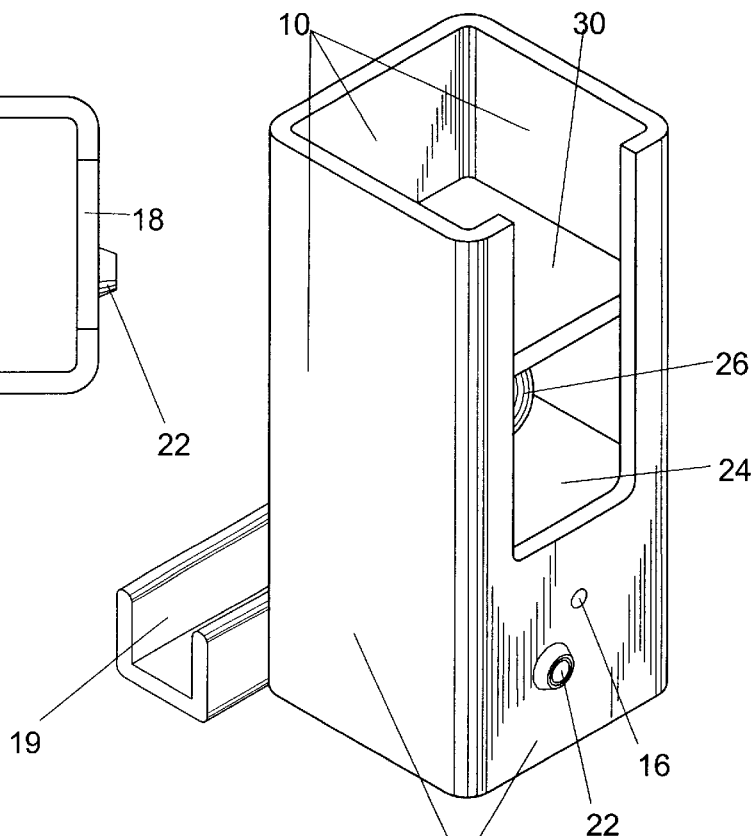
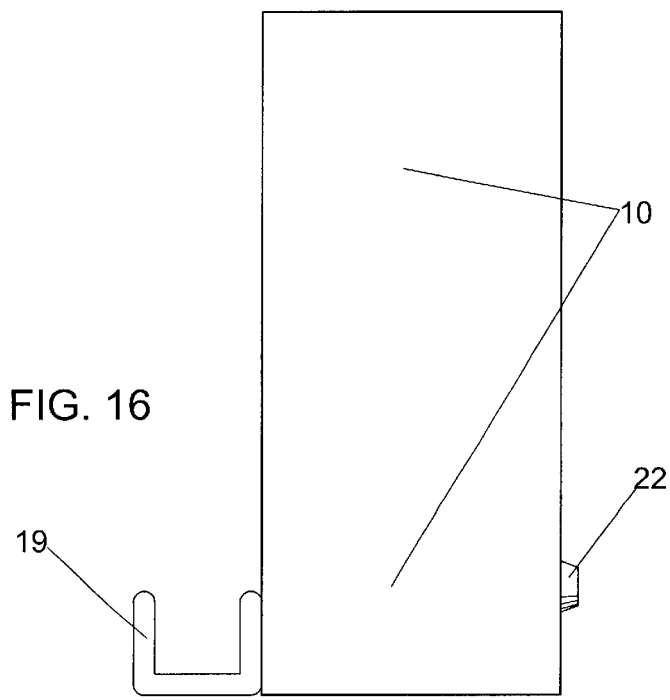
FIG. 15
FIG. 16
FIG. 17

SECURE TRAILER HITCHING POST

RELATED APPLICATIONS

This application claims benefit of prior filed provisional Application No. 60/188,466 entitled "Secure trailer hitching post" filed Mar. 10, 2000 in the name of Bruce H. Bale, said provisional application being hereby incorporated by reference as if fully set forth herein.

FIELD OF THE INVENTION

The field of the present invention relates to trailer hitches. In particular, a trailer hitching post is disclosed herein for securing a trailer when the trailer is not hitched to a towing vehicle.

BACKGROUND

Trailers of various sorts intended to be towed by private vehicles are quite numerous on the roads today, and are used to transport a wide variety of (sometimes) quite valuable objects, such as campers and other live-in recreational vehicles, boats and other water-craft, motorcycles, dirt bikes, and other sport/recreation vehicles, transport trailers, utility/tool trailers, and so forth. These trailers render the objects thereon easy to transport, but also make such objects easy to steal. All a would-be thief need do is arrive with a vehicle equipped with a suitable trailer hitch ball, couple the trailer to be stolen to his/her vehicle, and drive away. This problem is present whether the trailer is attached to an authorized towing vehicle, or is in storage attached to a hitching post of some sort. This is a long recognized problem, as evidenced by the many proposed solutions disclosed in U.S. Pat. Nos.: 5,094,423; 4,756,172; 5,195,339; 4,774,823; 5,873,271; 4,032,171; 5,087,064; 5,700,024; 5,584,495; 4,836,570; 4,577,884; 4,538,827; 3,857,575; 5,775,139; and 5,351,511. Each of these patents is hereby incorporated by reference as if fully set forth herein. In particular, many of these previous devices are deficient in that they permit access to locking and/or securing structures intended to prevent unauthorized removal and/or towing of the trailer, or they are not sufficiently robust to prevent unauthorized removal of the trailer through destruction of the device.

It is therefore desirable to provide a secure trailer hitching post for secure storage of a trailer that effectively denies unauthorized access to securing and/or locking structures thereof, and is sufficiently robust to effectively impede unauthorized removal of the trailer through destruction of the hitching post.

SUMMARY

Certain aspects of the present invention may overcome one or more aforementioned drawbacks of the previous art and/or advance the state-of-the-art of secure trailer hitching posts, and in addition may meet one or more of the following objects:

To provide a secure trailer hitching post for preventing unauthorized removal of a trailer secured thereto;

To provide a secure trailer hitching post wherein a coupler of a secured trailer is enclosed from the top and bottom and three sides;

To provide a secure trailer hitching post for preventing unauthorized access to a mechanism for securing the hitching post to a surrounding structure;

To provide a secure trailer hitching post for preventing unauthorized access to a locking mechanism thereof;

To provide a secure trailer hitching post that may be temporarily secured in a location for securing a trailer thereto;

To provide a secure trailer hitching post wherein a channel bracket secured thereto may be adapted to receive the lower edge of a garage door for securing the hitching post thereto; and To provide a secure trailer hitching post sufficiently robust to significantly impede unauthorized removal of the trailer by destruction of the hitching post.

One or more of the foregoing objects may be achieved in the present invention by a secure trailer hitching post comprising: a) a body having an open top and a front opening and being adapted to be secured to a surrounding structure; b) a hitch ball assembly comprising a hitch ball plate and a hitch ball, the hitch ball plate being positioned within and secured to the body and dividing the interior thereof into upper and lower portions; and c) a retainer assembly comprising a flat retainer plate and an apertured vertically depending tab connected thereto and received within a slot in the lower portion of the interior of the body. A sliding retaining shaft is positioned within apertures in the front of the body and the front of the slot, so that the retaining shaft may slide inward into the slot and through an aperture of the tab of the retainer assembly, thereby securing the tab within the slot and thereby securing the retainer assembly to the body. A coupler of a trailer is placed on and engaged with the hitch ball and the retainer assembly received within the top of the body with the tab received within the slot. The retaining shaft slides into the slot and through an aperture of the tab, and a locking mechanism is engaged to prevent the retaining shaft from sliding out of the aperture, thereby securing the coupler of the trailer to the trailer hitch and preventing unauthorized removal therefrom. The body may further comprise a horizontal channel bracket for receiving the lower edge of a garage door when the hitching post is placed on the ground and the garage door is closed. Closing and locking the garage door with the lower edge within the channel bracket serves to secure the hitching post to the garage door, but allows authorized moving and/or removal of the hitching post when desired.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIGS. 1 and 2 show exploded and assembled isometric views, respectively, of a secure trailer hitching post according to the present invention.

FIGS. 3, 4, and 5 show front, side cross-section, and top views, respectively, of a body of a secure trailer hitching post according to the present invention.

FIGS. 6, 7, and 8 show top, front, and bottom views, respectively, of a hitch ball assembly for a secure trailer hitching post according to the present invention.

FIGS. 9, 10, 11, and 12 show top, front, side, and bottom views, respectively, of a retainer assembly for a secure trailer hitching post according to the present invention.

FIGS. 15, 16, and 17 show top, side, and isometric views, respectively, of an assembled secure trailer hitching post with a bracket according to the present invention.

DETAILED DESCRIPTION OF PREFERRED AND ALTERNATIVE EMBODIMENTS

Figure 13:
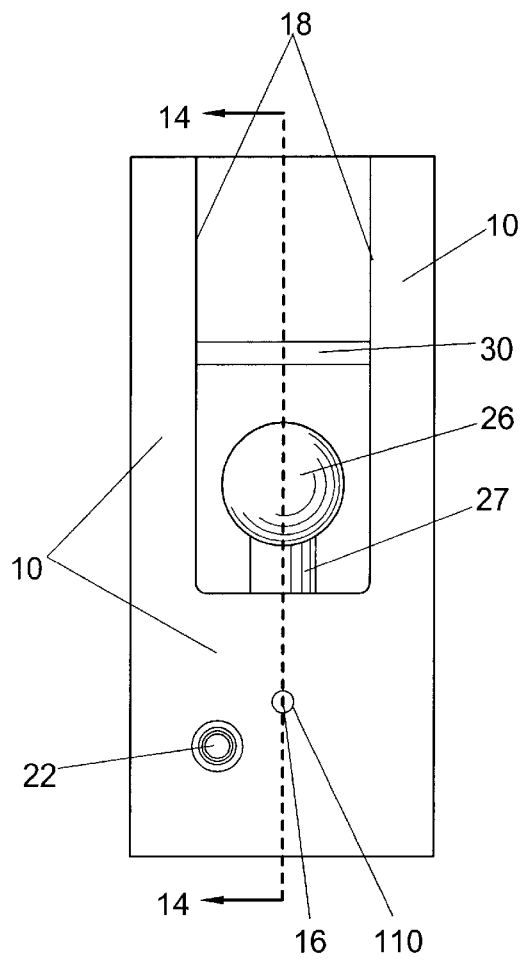
FIGS. 13 and 14 show front and side cross-section views, respectively, of an assembled secure trailer hitching post according to the present invention.
Figure 14:
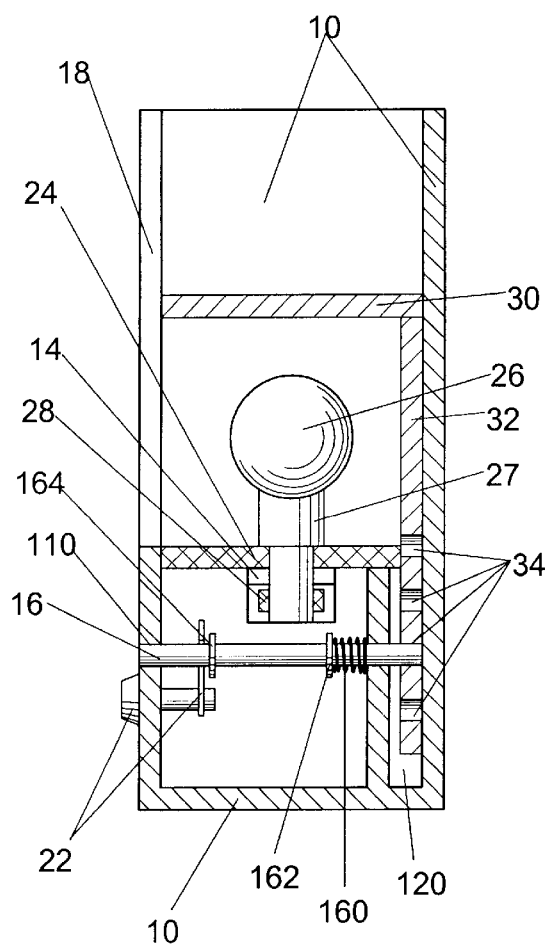

A secure trailer hitching post is depicted in FIGS. 1 through 14. The hitching post comprises a body 1, a hitch ball assembly 2, and a retainer assembly 3. FIGS. 1 and 2 show generally the assembly of body 1, hitch ball assembly 2, and retainer assembly 3 to form the trailer hitching post.

Body 1 is shown in detail in FIGS. 3, 4, and 5. Body 1 comprises, a vertical box 10 having a bottom, back, front, and two sides defining an interior, and an open top. Hitch ball assembly 2 and retainer assembly 3 are received by the open top when the hitching post is assembled. Box 10 is provided with a vertical slot 12 on the lower portion of the back inner surface. A reciprocating retaining shaft 16 is slidably positioned within an aperture 110 through the front of box 10 and within an aperture 120 through the front of vertical slot 12. Spring 160 and flange 162 may serve to urge shaft 16 outward through aperture 110, while flange 164 may serve to prevent shaft 16 from sliding out of aperture 120. Shaft 16 may be pushed through aperture 120 into slot 12 (thereby compressing spring 160), and a locking mechanism 22 may be employed to engage flange 164 and prevent sliding of shaft 16 out of slot 12. The front of the box is provided with an opening adapted to allow a coupler (not shown) of a trailer to be secured to be inserted therethrough and into the interior of box 10. A relatively wide slot 18 extending downwardly from the top of the box is depicted in the Figures, but any suitably sized, shaped, and/or positioned opening may be provided. Box 10 may be provided with brackets 14 for supporting hitch ball assembly 2 when the hitching post is assembled.

Hitching post assembly 2 is shown in detail in FIGS. 6, 7, and 8. Hitch ball plate 24 is shaped to substantially correspond to a horizontal cross-section of the interior of box 10, so that when positioned within and secured to box 10, plate 24 divides the interior of box 10 into upper and lower portions. Plate 24 may be provided with a notch 29 to enable access to slot 12 of body 1 when the hitching post is assembled. A hitch ball 26 is supported on, secured to, and extends substantially vertically from the upper surface of plate 24, and is adapted to be received by and to engage the coupler of the trailer. When the hitching post is assembled, plate 24 is positioned within and secured to box 10. This may be achieved in a preferred embodiment of the present invention by providing, on the lower surface of plate 24, a hitch ball locking plate 28 substantially parallel to, downwardly displaced from, and rotatably connected to plate 24. After positioning plate 24 within box 10 on brackets 14, locking plate 28 may be rotated so that the ends of locking plate 28 are positioned below each of the brackets 14. The locking plate 28 may then be urged upward against brackets 14, thereby securing plate 24 to box 10. In a preferred embodiment of the present invention, this may be achieved by providing threads (not shown) on the lower end of a hitch ball shaft 27 and corresponding threads (not shown) on locking plate 28. After positioning the ends of locking plate 28 below brackets 14, hitch ball 26 and shaft 27 may be rotated so that the threaded engagement of shaft 27 and locking plate 28 causes locking plate 28 to be urged upward against brackets 14, thereby securing plate 24 to box 10 and securing hitch ball 26 to plate 24.

Retainer assembly 3 is shown in FIGS. 9 through 12 and comprises a top retainer plate 30 and a substantially vertical depending tab substantially rigidly secured thereto. Tab 32 is provided with at least one aperture 34 (preferably a plurality of apertures 34) therethrough. To secure a trailer (not shown) to the secure trailer hitching post, hitch ball assembly 2 must be positioned within and secured to body 1, as described hereinabove. The coupler (not shown) of the trailer is placed over and engaged with hitch ball 26. As shown in FIGS. 1, 2, 13, and 14, tab 32 of retainer assembly 3 is then inserted into slot 12 of body 3, and the retainer assembly may be lowered until top retainer plate 30 comes into contact with the coupler. Retainer assembly 3 may then be raised until an aperture 34 of tab 32 aligns with aperture 120 of slot 12. Shaft 16 may then be pushed (against spring 160) to slide through aperture 120, into slot 12, and into the aperture 34, thereby securing tab 32 within slot 12 and securing retainer assembly 3 to body 1. Locking mechanism 22 may be employed to engage flange 164 and prevent sliding of shaft 16 out of aperture 34 of tab 32, thereby also preventing removal of the retainer assembly 3 from the body 1. The retainer assembly 3 thus secured to body 1 prevents removal of the coupler of the trailer from the hitch ball without releasing locking mechanism 22. Upon releasing locking mechanism 22, spring 160 urges shaft 16 out of aperture 34, thereby enabling removal of tab 32 from slot 12, removal of retainer assembly 3 from body 1, and removal of the coupler of the trailer from hitch ball 26. To facilitate removal of retainer assembly 3 from body 1, retainer plate 30 may be provided with one or more holes or other means for establishing a grip thereon (not shown).

The specific construction of the trailer hitching post contributes to the security of the trailer hitched thereto. Hitch ball plate 24 divides the interior of box 10 into upper and lower portions, and effectively denies access to the lower portion of the interior when retainer assembly 3 is secured to body 1. The lower portion of the interior contains locking mechanism 22, shaft 16, slot 12, and hitch ball locking plate 28. Access to one of more of these components could enable unauthorized (i.e., without unlocking locking mechanism 22) removal of the trailer from the hitching post, and is effectively denied by the separation of the lower portion of the interior by plate 24. When pushed into aperture 34 and locked into place by locking mechanism 22, shaft 16 should preferably be flush with or recessed from the front of box 10, thereby effectively inhibiting access to shaft 16 for forcible sliding of shaft 16 out of aperture 34 while locked by locking mechanism 22. With retainer assembly 3 in place, hitch ball 26 and the coupler of the trailer engaged therewith are enclosed from the top and bottom and on three sides, effectively blocking access to the coupler or hitch ball.

Box 10 may be provided on the bottom, back, front, and/or sides with holes (threaded or clearance), slots, tabs, brackets, pins, or any other suitable structure for enabling the hitching post to be secured to a surrounding environmental structure, such as a wall, the ground, a floor, and so forth. The security provided by the hitching post may be enhanced by providing access to such structures only from the lower portion of the interior of body 1. When hitch ball assembly 2 and retainer assembly 3 are secured to body 1, access to structures securing the hitching post to its surroundings is effectively denied. For example, clearance holes may be provided in the bottom of box 10 and threaded bolts provided in the floor or on the ground for projecting upward through the clearance holes. Body 1 may be secured to the floor or ground by nuts threaded onto the bolts and tightened against the bottom of box 10 before securing hitch ball assembly 2 to body. Alternatively, bolts may be inserted through the clearance holes in the bottom and or sides from within the lower portion of the interior of box 10 and into threaded holes in the floor, in a wall, or in some other suitable environmental structure. For securing the hitching post to the ground outdoors, an auger might be employed having a shaft with a threaded upper end. After driving the auger into the ground to the appropriate depth, the body 1 could be lowered onto the shaft with the threaded upper end protruding through a clearance hole in the bottom of the body 1 and secured with a nut. Access to the nut is effectively denied once hitch ball assembly 2 and retainer assembly 3 are secured to body 10. The body itself could not be used to remove the auger from the ground, since after any initial loosening, the body would no longer apply sufficient torque to the shaft. Many other functionally equivalent configurations may be devised for securing the trailer hitching post to surrounding environmental structure while remaining within the scope of inventive concepts disclosed and/or claimed herein.

An alternative method for securing the hitching post to its surroundings is shown in FIGS. 15, 16, and 17. A channel bracket 19 is provided substantially rigidly connected to the lower portion of the outer surface of the back of box 10. The channel bracket has a substantially "U"-shaped cross-section, and is positioned on box 10 so that the bottom of the "U" is substantially flush with the bottom of box 10. The channel may be sufficiently wide and sufficiently deep to receive a lower edge of a garage door (not shown) lowered thereinto. The hitching post may be secured by: 1) placing the trailer hitch below the garage door; 2) lowering the door until it rests within the channel bracket 19 (while the hitching post rests on the ground); and 3) locking the garage door. Locking the closed garage door thereby serves to lock the trailer hitching post into place in front of the garage door. The hitching post may be moved or removed upon unlocking and opening the garage door.

The locking mechanism 22 comprises a shaft, rotatable only by an authorized user having an appropriate key, combination, and/or code, and a tab substantially non-rotatably connected thereto. Rotation of the shaft moves the tab into contact with or away from shaft 16. When the tab of locking mechanism 22 is positioned away from shaft 16, shaft 16 may freely slide within apertures 110 and 120, thereby enabling insertion of tab 32 into and removal of tab 32 from slot 12. When in contact with shaft 16, the tab of locking mechanism 22 prevents free sliding of shaft 16 due to the flange 164. This is primarily intended to prevent sliding of shaft 16 out of slot 12 and aperture 34, thereby preventing unauthorized removal of the trailer from the secure trailer hitch. However, contact between the shaft 16 and the tab of locking mechanism 22 may also serve to prevent an unauthorized person from securing a trailer to the hitch, by preventing sliding of shaft 16 into slot 12 and aperture 34. This embodiment of locking mechanism 22 is exemplary only, and should not be construed as limiting the scope of inventive concepts disclosed and/or claimed herein. Other locking mechanisms may be contrived for maintaining shaft 16 within slot 12 and aperture 34 and preventing unauthorized removal of a trailer hitched to the secure trailer hitch. For example, instead of flange 164 on shaft 16 and a tab for locking mechanism 22, locking mechanism 22 may be provided with a cam substantially rigidly connected to the shaft of the locking mechanism, and shaft 16 may be provided with a transverse slot or groove for engagement therewith (not shown). Other functionally equivalent locking mechanisms may be employed as well.

In an alternative embodiment of the present invention (not shown), the retaining shaft and spring may be configured to urge the shaft into the slot, and the front end of the shaft may be provided with a handle or other means for establishing a grip thereon. To lock a trailer to the hitching post, the shaft is pulled outward against the spring to allow insertion of tab of the retainer assembly into the slot, and the shaft is released and allowed to slide into the slot and aperture under the urging of the spring. A locking mechanism may then be engaged to prevent sliding of the retaining shaft out of the aperture. After disengaging the locking mechanism, the retaining shaft is pulled out of the aperture against the spring to enable removal of the tab from the slot and removal of the retainer assembly from the body.

The secure trailer hitching post should be constructed of materials sufficiently rigid and durable to be consistent with the securing requirements of the device. Metal, wood, plastic, fiberglass, composites, and/or other materials may provide sufficient security. The hitching post is preferably constructed from metal to provide the highest level of security, and most preferably from stainless steel to resist corrosion in some environments where the hitching post is likely to be used (i.e., outdoors exposed to weather). Substantially rigid connections between components may be most preferably made by welding, although other ways of making substantially rigid connections (rivets, bolts, screws, tab/slot combinations, locking fasteners, other fasteners, functional equivalents, and so forth) may be employed without departing from inventive concepts disclosed and/or claimed herein. Such fasteners should preferably be employed in a way that prevents unauthorized unfastening when the trailer hitch is assembled and locked. The metal used may be as thick as desired, and the connections made as robust as desired, to provide a sufficiently significant impediment to unauthorized removal of a secured trailer by destruction of the secure hitching post. Likewise, the metal used may be made as light-weight as desired (consistent with the desired level of trailer security) for ease and/or economy of manufacture. The lower portion of the body may be provided with one or more small openings near the bottom to provide water drainage for a hitching post used outdoors. These openings are preferably sufficiently small to prevent unauthorized access therethrough to the lower portion of the interior of the body.

A secure trailer hitching post according to the present invention may also be used to deny access to a trailer coupler without securing the hitching post to a surrounding structure. The coupler may simply be secured to the hitching post as described hereinabove. Even when not secured to a surrounding structure, the trailer hitching post according to the present invention effectively prevents access to the trailer coupler. A would-be thief would therefore be unable to tow away a trailer with a coupler thereof thus secured. Such non-secured use of the trailer hitching post may be particularly desirable at remote locations such as campgrounds, parks, recreation areas, boat launch areas, parking lots, roadsides, roadside rest areas, and so forth.

The present invention has been set forth in the forms of its preferred and alternative embodiments. It is nevertheless intended that modifications to the disclosed secure trailer hitching post may be made without departing from inventive concepts disclosed and/or claimed herein.

What is claimed is:

1. A trailer hitching post, comprising:
   a body;
   a hitch ball assembly; and
   a retainer assembly,
   wherein:
   the body comprises a substantially vertical box having a bottom, back, front, and two sides defining an interior, and an open top for receiving the hitch ball assembly and the retainer assembly;

the hitch ball assembly comprises a hitch ball plate positioned within and secured to the body and dividing the interior thereof into an upper portion and a lower portion, and a hitch ball supported on, secured to, and extending substantially vertically from an upper surface of the hitch ball plate;

the retainer assembly comprises a top retainer plate and a substantially vertically depending apertured tab substantially rigidly connected thereto;

an upper portion of the front of the body is provided with an opening providing access therethrough into the upper portion of the interior of the body;

the body is adapted to be secured to a surrounding structure;

an inner back surface of the lower portion of the interior of the body is provided with a substantially vertical slot for receiving the vertically depending apertured tab of the retainer assembly;

the body is provided with a reciprocating retaining shaft slidably positioned within an aperture through the front of the body and an aperture through a front surface of the slot on the inner surface of the back of the body;

the retaining shaft may slide into the vertical slot and into an aperture of the vertical tab of the retainer assembly, thereby securing the vertical tab within the vertical slot and thereby also securing the retainer assembly to the body;

the retaining shaft may slide out of the aperture of the vertical tab of the retainer assembly, thereby enabling removal of the vertical tab from the vertical slot and thereby also enabling removal of the retainer assembly from the body; and the body is provided with a locking mechanism for engaging the retaining shaft and for preventing, while the locking mechanism is engaged with the retaining shaft, sliding of the retaining shaft out of the aperture of the vertical tab, thereby also preventing removal of the retainer assembly from the body.

2. The trailer hitching post of claim 1, wherein:

the opening provided on the upper portion of the front of the body is adapted to admit therethrough a coupler of a trailer into the upper portion of the interior of the body;

the hitch ball is adapted to be received by and to engage the coupler; and the retainer assembly is adapted to prevent, when secured to the body, removal of the coupler, when engaged with the hitch ball, from the hitch ball.

3. The trailer hitching post of claim 1, wherein:

an inner surface of each side of the body is provided with an inwardly extending, substantially horizontal, substantially flat support bracket for supporting the hitch ball plate; and the hitch ball assembly is provided with a hitch ball locking plate substantially parallel to, downwardly displaced from, and rotatably connected to a lower surface of the hitch ball plate, and the hitch ball locking plate may be rotated so that each end thereof lies below one of the support brackets and may be urged upwardly against the support brackets, thereby securing the hitch ball assembly to the body.

4. The trailer hitching post of claim 3, wherein:

the hitch ball plate is provided with a hole therethrough;

the hitch ball includes a substantially vertical hitch ball support post with an enlarged-diameter upper portion thereof and a threaded reduced-diameter lower portion thereof;

the lower portion of the hitch ball support post passes through the hole in the hitch ball plate so that the upper portion of the hitch ball support post rests on the hitch ball plate, thereby supporting the hitch ball on the hitch ball plate;

the hitch ball locking plate is provided with a threaded hole therethrough for engaging the lower portion of the hitch ball support post; and rotating the hitch ball to engage the threaded portion of the hitch ball support post and the threaded hole of the hitch ball locking plate serves to urge the hitch ball locking plate upwardly against the support brackets, thereby securing the hitch ball assembly to the body.

5. The trailer hitching post of claim 1, wherein securing the retainer assembly to the body serves to prevent removal of the hitch ball assembly from the body.

6. The trailer hitching post of claim 1, wherein securing the hitch ball assembly to the body serves to prevent access to the lower portion of the interior of the body.

7. The trailer hitching post of claim 1, wherein access to the lower portion of the interior of the body is required to release the body from the surrounding structure to which it may be secured.

8. The trailer hitching post of claim 7, wherein the bottom of the body is provided with at least one hole therethrough adapted for receiving therethrough a member for securing the body to the surrounding structure.

9. The trailer hitching post of claim 7, wherein the back of the lower portion of the interior of the body is provided with at least one hole therethrough adapted for receiving therethrough a member for securing the body to the surrounding structure.

10. The trailer hitching post of claim 1, wherein the locking mechanism comprises a locking shaft and a locking flange, the locking shaft being rotatably secured to the body and substantially rigidly secured to the locking flange, so that rotation of the locking shaft may engage and disengage the locking flange and the retaining shaft.

11. The trailer hitching post of claim 10, wherein the retaining shaft is provided with a radially-extending circumferential flange for engaging the locking flange of the locking mechanism.

12. The trailer hitching post of claim 1, wherein the retaining shaft is provided with a spring for urging the retaining shaft against the locking mechanism when the locking mechanism is engaged, and for pushing the retaining shaft out of the aperture when the locking mechanism is disengaged.

13. The trailer hitching post of claim 1, wherein the lower portion of the interior of the body is provided with at least one drainage hole.

14. A trailer hitching post as recited in claim 1, further comprising a bracket substantially rigidly connected to a lower portion of an outer surface of the back of the body, wherein the bracket comprises an elongated channel having a substantially "U"-shaped cross-section having a bottom surface substantially flush with the bottom of the body and being adapted to receive a lower edge of a garage door and to thereby secure the body to the garage door while the garage door is lowered and received within the channel and locked into place.

* * * * *